United States Patent [19]

Kunii

[11] 4,337,066
[45] Jun. 29, 1982

[54] APPARATUS FOR THERMALLY DECOMPOSING AND GASIFYING COMBUSTIBLE MATERIAL IN A SINGLE FLUIDIZED REACTOR

[76] Inventor: Daizo Kunii, No. 25-16, Nakamachi 1, Meguro-ku, Tokyo, Japan

[21] Appl. No.: 109,294

[22] Filed: Jan. 3, 1980

[30] Foreign Application Priority Data

Jul. 11, 1979 [JP] Japan ................................. 54-87584

[51] Int. Cl.$^3$ ............................................... C10J 3/56
[52] U.S. Cl. .......................................... 48/63; 48/206; 48/111; 422/141; 422/142; 422/147
[58] Field of Search .................... 48/197 R, 202, 206, 48/63, 77, 62, 64, 111; 266/172; 422/141, 142, 147

[56] References Cited

U.S. PATENT DOCUMENTS 2,527,197 10/1950 Rollman ................................ 48/206
2,527,198 10/1950 Rollman ................................ 48/206

FOREIGN PATENT DOCUMENTS

51-17561 6/1976 Japan ............................... 48/197 R

Primary Examiner—Peter F. Kratz
Attorney, Agent, or Firm—Kane, Dalsimer, Kane, Sullivan and Kurucz

[57] ABSTRACT

Apparatus for thermally decomposing and gasifying either liquid or solid combustible material in a single reactor filled with working medium in a high active fluidization, said reactor being provided with two partitions, one of which is extended downwards up to the lower portion of the reactor, while the other is vertically extended at the lower and middle portions thereof substantially at a right angle to the first partition, whereby the reactor is divided into two sections, that is, thermal decomposition and gasification section and combustion and heating section, so that thermal decomposing and gasifying are performed by way of supplying the combustible raw material into the downwardly travelling working medium and at the same time supplying steam thereinto for generating and maintaining the high active fluidization of the working medium in the thermal decomposition and gasification section, while burning and heating are performed by way of supplying air or steam mixture gas of oxygen and steam into the upwardly travelling working medium accompanied by carbonaceous material produced during the preceding process to burn said carbonaceous material in the combustion and heating section.

8 Claims, 13 Drawing Figures

APPARATUS FOR THERMALLY DECOMPOSING AND GASIFYING COMBUSTIBLE MATERIAL IN A SINGLE FLUIDIZED REACTOR

BACKGROUND OF THE INVENTION

1. Field of the Invention

The present invention relates to a method for thermally decomposing either liquid or solid combustible material in a single reactor in the presence of working medium for generating and maintaining high active fluidization therefor. Further the present invention relates to an apparatus for carrying out the aforesaid method using the cylindrical reactor in which thermal decomposing and gasifying as well as burning and heating are performed with the aid of the circulating working medium heated at an elevated temperature.

2. Brief Description of the Prior Art

Hitherto known is a method in which two fluidized reactors are mounted with communication passages arranged therebetween, through which working medium in the form of powder-grain composite continuously circulates for the purpose of lightening heavy type crude oil by way of contact cracking so as to obtain kerosene or light oil. The inventor carried out a variety of research and development works for producing olefin by way of thermal decomposing in accordance with the aforesaid hitherto known method, resulting in four Japanese Pat. Nos. 606,666, 618,165, 625,300 and 768,886 granted. Further the inventor continued to carry out the aforesaid research and development works using the aforesaid known method for thermally decomposing solid combustible wastes by way of circulating sand as working medium, resulting in another two Japanese Pat. Nos. 871,982 and 911,193 granted.

It is pointed out as drawbacks with the above described prior methods, however, that the whole thermal decomposition system comprising the two fluidized reactors with the communicating means arranged for circulation therebetween is complicated in structure and not easy to be operated, that a large volume of thermal energy tends to be lost because of the wide surface of the whole assembly, particularly in case thermal decomposition reaction takes place at an elevated temperature, and that high thermal stress appears due to the complexity of the whole structure of the system.

In case of the conventional methods in which the working medium in the form of powder-grain composite circulate between the two fluidized reactors, gas is removed separately from the respective fluidized reactors. This ensures an advantage that high caloric combustible gas substantially free from nitrogen involved therein is produced even in case air is used for generating thermal energy for process operation in which either liquid or solid raw material is treated. For this reason it is recognized that the above described working medium circulation system is acceptable particularly for thermal decomposition of either liquid or solid combustible material such as pitch, asphalt, tar sand, bitumen, waste oil, heavy type crude oil, regular coal, brown coal, turf, peat, solid wastes inclusive combustible components therein from kitchen and factory, plant wastes from agriculture and forest industries, biomass manufactured for the purpose of generating thermal energy or the like, each of which is considered as useful energy source in near future.

It is to be noted, however, that among the above listed future energy sources waste oil, low caloric coal such as brown coal, turf and peat, miscellaneous wastes, industrial wastes, combustible wastes from agriculture and forest industries, biomass or the like is different from petroleum particularly in respect of operation scale, because a mass processing is not always acceptable for the former, whereas the latter is usually processed in a centralized installation in a large scale. It is rather economical for the former that a small or middle scale of installation is located therefor in position within or adjacent to the place where the former is collected or produced so that said installation serves as a local supply source of thermal energy.

As a typical case a wood working factory in an under-developed country will be exemplified. It is easy to collect wood wastes from forest industry as energy source. They are gasified to produce medium caloric combustible gas which is supplied to combustion engines or boilers. This results in saving in gasoline or oil.

It will be obvious that the aforesaid conventional methods in which the working medium in the form powder-grain composite circulates between the two fluidized reactors is preferable for generating thermal energy with the use of the aforesaid hitherto unused energy sources. But the prior methods are not always economically acceptable for a middle scale of operation, especially in case of a small scale of processing because of the complexity of the structure and operation of the whole system as well as the tendency of a large amount of heat loss therefrom.

SUMMARY OF THE INVENTION

In view of the above described drawbacks with the prior methods the present invention is intended to eliminate them so that the above listed useful energy sources are thermally decomposed and gasified at a higher efficiency and safety in a small as well as middle scale of operation. The present invention consists in that the working medium in the form of powder-grain composite is steadily and continuously circulated within a single reactor in a high active fluidization without two fluidized reactors with communicating means arranged therebetween, as is the case with the conventional methods, resulting in substantially reduced heat loss, that thermal energy required for thermal decomposing and gasifying is provided by way of burning or partially oxidizing the residual carbonaceous material produced after completion of thermal decomposition and gasification with the aid of air or if required, mixture gas of oxygen and steam and that a part of thermal energy required for thermal decomposing and gasifying is provided by way of thermal conducting through partitions, whereby high caloric combustible gas is produced.

Thus it is an object of the present invention to provide a method and apparatus, in which either liquid or solid combustible material is thermally decomposed and gasified with the aid of a single reactor at a high efficiency so that the required combustible gas substantially free from nitrogen is produced therein.

It is other object of the present invention to provide a method and apparatus, in which thermal decomposition of combustible material and combustion of residual carbonaceous material are performed within the single reactor so that they are completely gasified.

It is another object of the present invention to provide a method and apparatus, in which the combustible material is continuously or intermittently supplied into the single reactor in such a manner that operation is automatically performed, while ash caused after complete gasification is continuously or intermittently removed therefrom preferably in an automatic manner.

It is still another object of the invention to provide a method and apparatus, in which the predetermined operations are performed with the use of the single reactor which is simple in structure and easy to be manufactured and installed.

Other objects and advantageous features of the present invention will be apparent from the following description with reference to the accompanying drawings.

BRIEF DESCRIPTION OF THE ACCOMPANYING DRAWINGS ILLUSTRATING THE PREFERRED EMBODIMENT OF THE INVENTION

Now the present invention will be described in more details with reference to the accompanying drawings illustrating the preferred embodiments of the invention, in which.

DETAILED DESCRIPTION OF THE PREFERRED EMBODIMENT OF THE INVENTION

Now with reference to FIGS. 1 to 6 the typical embodiment of the invention will be described below.

As illustrated in the drawings, a partition 2 is extended substantially in the vertical direction within in the reactor 1 such that the upper space in the reactor 1 is divided into two sections. In the middle part of the reactor 1 is provided another partition 3 which is extended substantially at a right angle to said partition 2, whereby the lower portion below the middle part of the reactor is divided into four space segments. Thus the reactor 1 is constructed in the form of cylindrical hollow tower dimensioned such that it has an increased inner diameter in the upper half of length, while having a tapered portion in the lower half of length thereof, wherein the total length of the tower comes to longer than three times as large as its inner diameter at the middle part thereof, so that the interior of the tower is divided into two space sections at the upper portion, into four sections at the middle portion and into two space sections at the lower portion.

Figure 1:
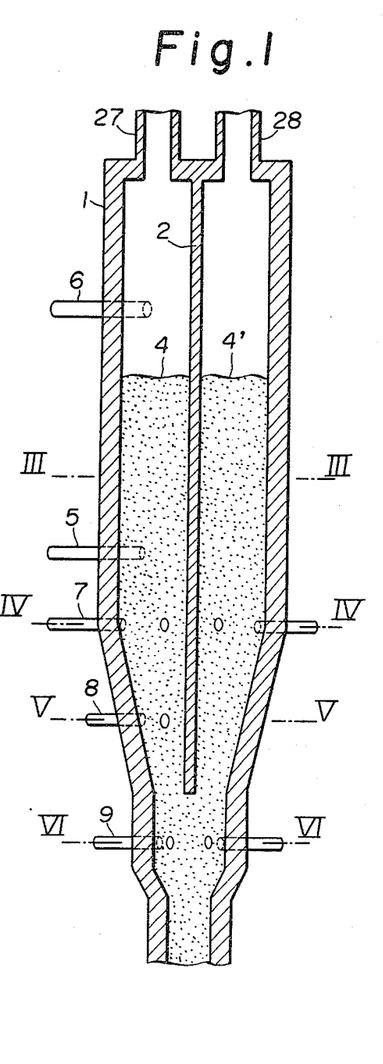
FIG. 1 is a vertical sectional view of a reactor in accordance with a typical embodiment of the invention, taken in line I—I in FIG. 4.
Figure 2:
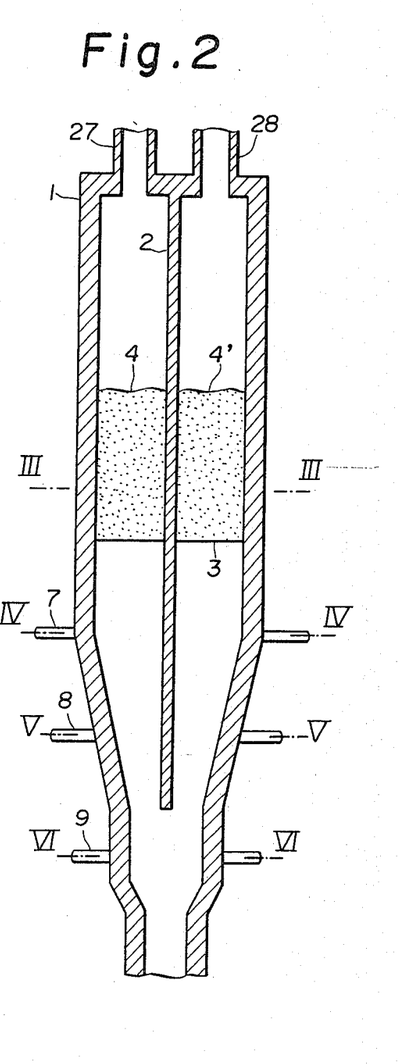
FIG. 2 is a vertical sectional view of the reactor similar to FIG. 1, taken in line II—II in FIG. 4.

The reactor is filled with working medium in the form of powder-grain composite materials having mean grain size in the range of 0.05 to 4 mm in the respective space sections, said powder-grain, composite materials being maintained in high actively fluidized bed. It is to be noted that the high actively fluidized beds in the respective space sections are in communication with each other through the lower end of the partition at the lower part of the reactor, whereby the upper surfaces 4 and 4' of the fluidized beds in the upper portion of the two space sections are located in the substantially same level, as illustrated in FIGS. 1 and 2. The powder-grain composite material filled in the high actively fluidized bed may be any of carbon containing grain material such as coke, char or sand, refractory grain material, catalyzer carrier, coal ash granulated material, cement clinker, alumina sand or other inactive granular material or may be porous granular material carrying catalyzer therein such as CaO.

Combustible material to be treated may be either in the form of liquid or solid. In the former case crude oil, residual oil in normal pressure refining operation or reduced pressure refining operation, pitch, asphalt, tar, tar sand, bitumen, waste oil, oil and pulverized coal mixed slurry or the like are available as raw material. In the latter case, on the other hand, coal material such as regular coal, brown coal, lignite, turf, peat or the like, solid combustible waste material, industrial combustible waste material, house building waste material, wood chips or fractions from forestry industry, biomass produced for the purpose of energy generation or the like are also available preferably in a size smaller than 20 mm in a form of powder, grain or block, each of which is subjected to pretreating to such form prior to putting in use.

In FIG. 1 the reference numerals designates a supply port through which either liquid or solid combustible raw materials are continuously fed so that it is highly actively fluidized in the reactor in the known manner. Preferably the mixing and dispersion of the supplied raw materials into the fluidized bed are facilitated by way of feeding of steam. Further any manner of feeding of raw material and any location, form and number of supply port may be available, if the raw material is properly supplied into the middle or upper portion of one of the two fluidized bed sections divided by means of the vertically extending partition 2 in the reactor. Alternatively the supply port may be such that its extreme end protrudes into the interior of the fluidized bed. In case the raw material is solid particularly in the form of grain or block, it is not necessarily required that it is fed into the interior of the fluidized bed and thus it may be supplied through the supply port 6 located above the upper surface of the high actively fluidized bed, as illustrated in FIG. 1. The supplying of the raw material may be effected in any manner such as by way of falling over the surface of the fluidized bed.

The high actively fluidized beds divided into the fluidization sections by means of the partition 2 in the reactor are maintained in high active fluidization by way of supplying steam through the feed ports 7, 7'; 8, 8'; 9, 9' as shown in FIGS. 1, 2, 4, 5 and 6, said high active fluidization being maintained at a temperature in the range of 500° to 950° C. with mean void ratio of 0.45 to 0.85 among the filled powder-grain composite materials, whereby the supplied combustible liquid or solid raw materials are extensively mixed and dispersed into the high actively fluidized beds within the very short period of time so as to be subjected thermal decomposition and gasification.

As seen from FIG. 1, one thermal decomposition and gasification section in the high actively fluidized bed comes in communication via the lower end of the vertically extending partition 2 with the other section of said high actively fluidized bed, that is, the combustion and heating section for the circulating powder-grain materials containing carbon or carbonaceous material therein which is produced by said thermal decomposition and gasification of the supplied raw materials. The powder-grain materials heated to an elevated temperature in the range of 700° to 1,050° C. by way of combustion or partial oxidation of the carbon containing materials are dispaled in the upward direction in the reactor, maintaining the high active fluidization with the aid of steam supplied through the feed ports 9, 9'; 8, 8'; 7, 7', whereby sufficient thermal energy is provided for the raw materials continuously supplied to be thermally decomposed and gasified in the adjacent high actively fluidized section. This is the case that one of the high actively fluidized sections divided by means of the partition 2 is for thermal decomposition and gasification at the temperature in the range of 500° to 950° C., while the other is for combustion and heating at the temperature in the range of 700° to 1,050° C., so that thermal energy is conducted to the thermal decomposition and gasification section by way of thermal conducting through the partition 2, resulting in a part of thermal energy necessary for thermal decomposition and gasification ensured.

Now in order to facilitate the understanding of the invention, the circulating displacement of said carbon containing working medium in the form of powder-grain composite materials will be described in further details with reference to FIGS. 3 to 6.

Figure 3:
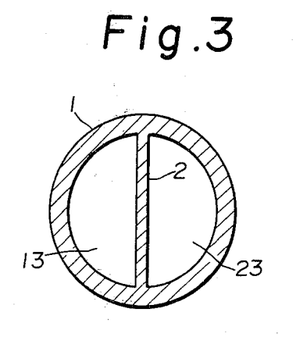
FIG. 3 is a cross sectional view of the reactor, taken in line III—III in FIGS. 1 and 2.
Figure 4:
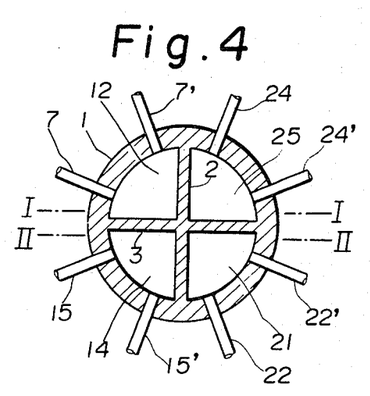
FIG. 4 is a cross sectional view of the reactor, taken in line IV—IV in FIGS. 1 and 2.
Figure 5:
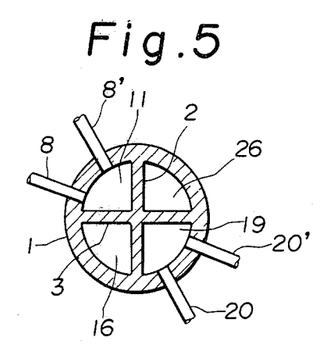
FIG. 5 is a cross sectional view of the reactor, taken in line V—V in FIGS. 1 and 2.
Figure 6:
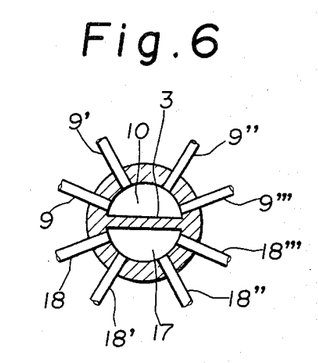
FIG. 6 is a cross sectional view of the reactor, taken in line VI—VI in FIGS. 1 and 2.

The powder-grain materials, heated to the elevated temperature by burning the carbon containing materials or carbonaceous material, are fluidized and displaced upwards from the section 10 in FIG. 6 with the aid of steam supplied therein through the feed ports 9 and 9' and enter the section 11 in FIG. 5, then are further displaced upwards into the section 12 in FIG. 4 with the aid of steam supplied in the preceding section 11 through the feed ports 8 and 8' so that they are fluidized therein by means of steam supplied through the feed ports 7 and 7' and thereafter they are dispersed and mixed into high actively fluidized bed in the section 13 in FIG. 3, whereby thermal energy required for thermal decomposition and gasification is provided.

As described above, the combustible raw materials supplied into the middle or upper portion of the reactor through the feed port 5 or 6 are dispersed and mixed into the high actively fluidized bed at the temperature in the range of 500° to 950° C. so as to be subjected to thermal decomposition and gasification therein, causing carbonaceous solid materials to be produced. Then said carbonaceous solid materials are displaced together with the circulating powder-grain materials onto which the former are adhered or in the form of another independent powder-grain material which are mixed in the latter. The carbonaceous solid materials produced by way of thermal decomposition and gasification at the upper area of the partition 2 in the reactor are displaced downwards from the section 13 in FIG. 3, accompanied by the circulating powder-grain materials, and then enter the section 14 in FIG. 4 by means of the partition 3 in the reactor in FIG. 2. In FIG. 4 the reference numerals 15 and 15' designate a steam feed port, through which steam is supplied so as to ensure the thermal decomposition and gasification portion in line IV—IV in FIGS. 1 and 2 to be high actively fluidized. Then the powder-grain materials containing the so produced carbon containing materials therein are displaced further downwards from said section 14 to enter the section 16 in FIG. 5 and thereafter they are displaced downwards furthermore to enter the section 17 in FIG. 6.

FIG. 6 is a cross sectional view of the reactor, taken in line VI—VI in FIGS. 1 and 2, and in this area steam is supplied therein through the steam feed ports 18, 18', 18" and 18"' so that the high active fluidization is ensured thereat and at the same time the circulating speed of the powder-grain materials is controlled.

Now the above operation of the reactor will be described again with reference to FIG. 2. The solid carbonaceous materials produced by way of thermal decomposition and gasification on the left side of the partition 2 within the high actively fluidized bed in the reactor enter the front side of the partition 3 seen in FIG. 2 and then they are displaced downwards through the level in line IV—IV and the lower level in line V—V to the lowest level in line VI—VI, in which they are displaced to the right side of the partition 2 with the aid of steam flowing at the level in line VI—VI.

Again the subsequent displacement of the powder-grain materials will be described with reference to FIGS. 6, 5, 4 and 3. The powder-grain materials located in the section 17 in FIG. 6 are displaced upwards through the high actively fluidized bed with the aid of steam supplied through the feed ports 18, 18' 18" and 18"'. Namely they are displaced from the section 17 in FIG. 6 to the section 19 in FIG. 17 and then they are displaced upwards further, being maintained in the high active fluidization with the aid of steam or mixture of air or oxygen and steam supplied through the feed tubes 20 and 20' in said section 19 so that they enter the section 21 in FIG. 4. In FIG. 4 the reference numerals 22 and 22' designate an air feed port respectively, through which air is supplied so as to maintain the powder-grain materials in said section 21 in the high active fluidization and at the same time allow the accompanying carbonaceous materials to be subjected to combustion or partial oxidation so as to heat the circulating powder-grain materials, whereby thermal energy required for the aforesaid thermal decomposition and gasification is generated. It is to be noted that gaseous materials supplied through said feed ports 22 and 22' is not limited to air but it may be any oxygen containing gas, for instance, mixture gas of oxygen and steam.

Since the high actively fluidized bed in the section 21 in FIG. 4 comes in communication with that in the next upper section 23 in FIG. 3, the carbonaceous materials accompanied by the powder-grain materials are subjected to substantially complete combustion with the aid of air or mixture gas of oxygen and steam supplied through the feed ports 24 and 24' located in the high actively fluidized bed within the section 23 in FIG. 3. Thus the powder-grain materials heated to the elevated temperature high than that in the thermal decomposition and gasification section by 100° to 550° C. owing to the aforesaid combustion or partial oxidation of the carbonaceous materials are displaced downwards from the section 23 in FIG. 3 into the section 25 in FIG. 4 and thereafter they are delivered through the section 26 in FIG. 5 to the section 10 in FIG. 6. At this moment steam is supplied through the feed ports 9''' and 9'''' into the section 10 so as to carry out controlling so that the powder-grain materials in the section 10 continuously and steadily circulate into the other high actively fluidized bed beyond the partition 2, maintaining the high active fluidization.

The hot powder-grain materials which descend to the section 10 in FIG. 6 are displaced into the lower portion of the high actively fluidized bed to the left side of the partition 2 as seen in FIG. 1 due to the function of the steam blown therein through the feed ports 9, 9', 9'' and 9''' and then they are displaced upwards by means of the steam supplied through the feed tubes 8 and 8' located in the level in line V—V as well as through the feed tubes 7 and 7' located in the level in line IV—IV, whereby thermal energy required for thermal decomposition and gasification is provided for the high actively fluidized beds in the section 12 in FIG. 4 and the section 13 in FIG. 3 and at the same time either liquid or solid combustible raw materials supplied through the feed port 5 or 6 are well mixed and dispersed into the high actively fluidized bed, causing satisfactory thermal decomposition and gasification to take place therein.

As described above, the present invention lies in that owing to the arrangement that a vertically extending portion is provided in a single reactor which comprises two divided sections at the upper portion, four divided sections at the middle portion and two divided sections at the lower portion thereof so that a circulating passage is formed therethrough for the working medium in the form of powder-grain composite material filled in said single reactor, thermal decomposition takes place for either liquid or solid combustible raw material which is supplied into the high actively fluidized bed with the air of blown steam so that high caloric gas almost free from nitrogen involved therein is produced and that due to combustion or partial oxidation of the carbonaceous material produced during the aforesaid thermal decomposition and gasification, said combustion or partial oxidation taking place with the use of air or mixture gas of oxygen and steam in the other section of the high actively fluidized bed, the working medium in the form of powder-grain material is heated so that thermal energy required for thermal decomposition is directly supplied, while a part of thermal energy required for the aforesaid thermal decomposition is supplied by way of thermal conducting through the partition.

The gaseous product generated during the aforesaid thermal decomposition and gasification is removed through the outlet port 27 located at the top portion of the reactor as shown in FIGS. 1 and 2 and then is transferred to the subsequent process. On the other hand, the combustion gas or combustible gas generated during the aforesaid combustion and partial oxidation of the carbonaceous materials is removed through another outlet port 28 in FIGS. 1 and 2 and thereafter is transferred to the subsequent process.

Figure 7:
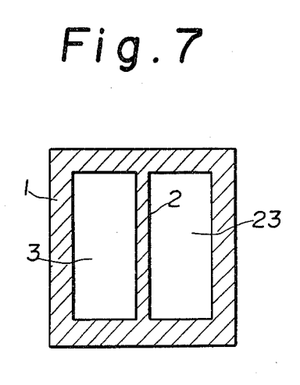
FIG. 7 is a cross sectional view of a reactor in accordance with a modified embodiment of the invention, corresponding to FIG. 3 in case of the preceding embodiment thereof.
Figure 8:
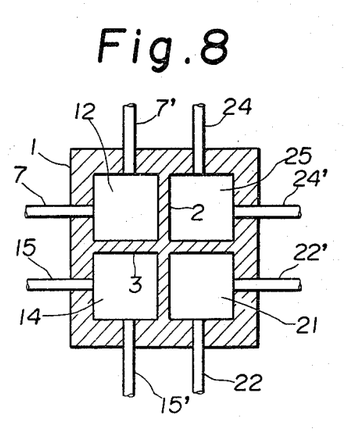
FIG. 8 is another cross sectional view of the reactor in FIG. 7, corresponding to FIG. 4 in the preceding embodiment of the invention.

As seen from FIGS. 1 to 6, the present invention has been typically described with respect to the cylindrical reactor for the purpose of simplification of description and illustration, but it should be noted that the same is by no means limited only to this type of reactor. The same may have a rectangular or oval section or any other sectional configuration, as illustrated in FIGS. 7 and 8. It is to be noted that FIG. 7 corresponds to FIG. 3 in which the reactor has a circular section, while FIG. 8 does to FIG. 4.

Figure 9:
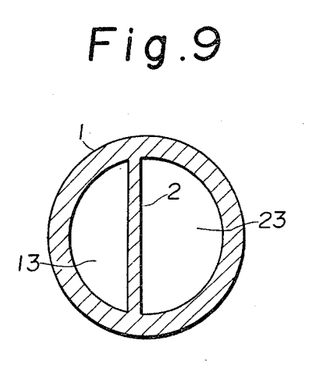
FIG. 9 is a cross sectional view of a reactor in accordance with another modified embodiment of the invention, corresponding to FIG. 3 in the preceding embodiment thereof, wherein the partition is located in a position different from that in FIG. 3.
Figure 10:
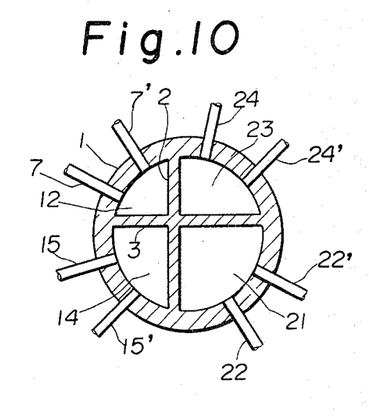
FIG. 10 is another cross sectional view of the reactor in FIG. 9, corresponding to FIG. 4, wherein the first and second partitions are located in positions different from those in FIG. 4.

FIGS. 1 to 8 illustrate the arrangement of the reactor in which the partitions are located in a symmetrical manner, but the present invention isn't limited to this symmetrical arrangement. The reactor may have an unsymmetrical cross section, as illustrated in FIGS. 9 and 10. Particularly FIG. 9 corresponds to FIG. 3 in which the reactor has a symmetrical circular configuration, while FIG. 10 does to FIG. 4.

Figures 11, 12:
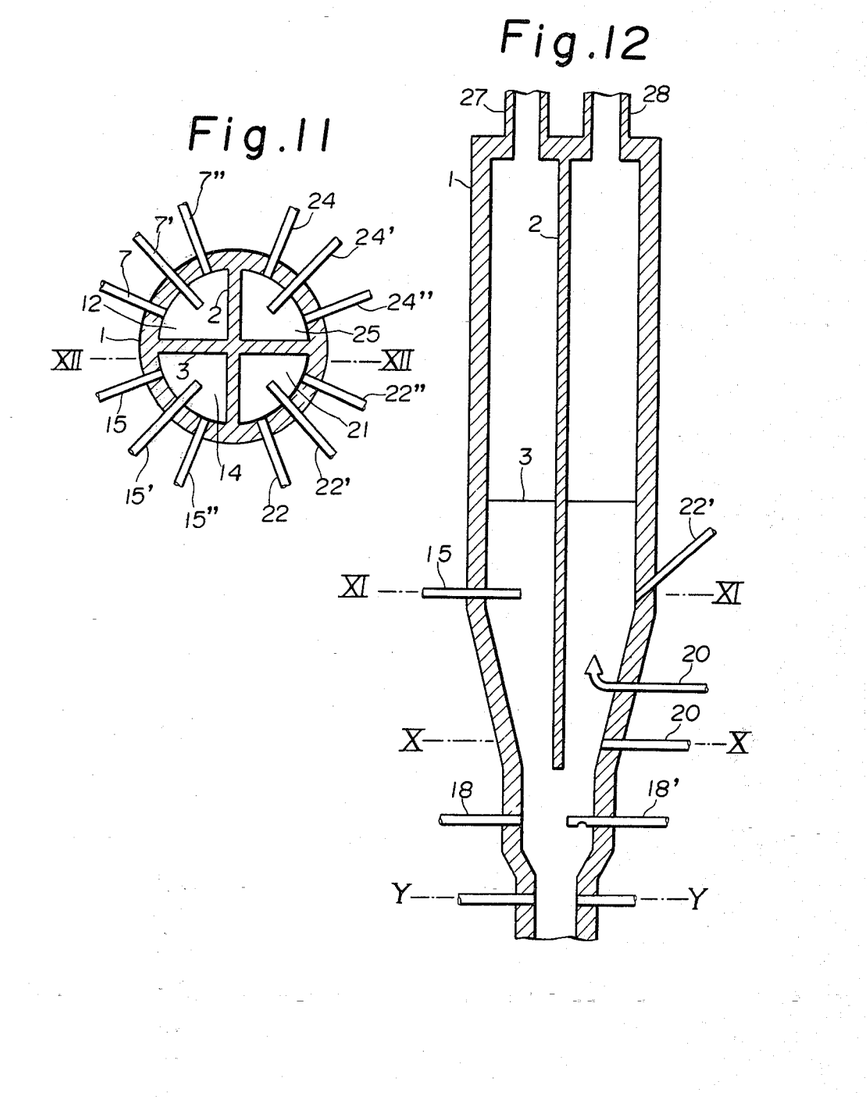
FIG. 11 is a cross sectional view of a reactor in accordance with other modified embodiment of the invention, taken in line XI—XI in FIG. 12.
FIG. 12 is a vertical sectional view of the reactor, taken in line XII—XII in FIG. 11.

Further as illustrated in FIGS. 1 to 10, the supply ports or feed ports are opened at the inner wall of the reactor in view of the simpification of description and illustration. It should be of course understood that the present invention isn't limited only to this arrangement and location. As illustrated in FIG. 11, for instance, the feed ports 7', 15', 22' and 24' may protrude into the middle portion of the respective fluidized sections, that is, into the central part of the respective high actively fluidized beds. In this connection it is to be noted that FIG. 11 corresponds to FIG. 4 in the above described typical embodiment of the invention and further that any location, shape or form and number of feed ports through which steam, air or mixture of oxygen and steam is to be supplied into the reactor may be available for the invention, such as an inclined feed port 22' as illustrated in FIG. 12 which corresponds to FIG. 2 which represents a vertical sectional view of the reactor, taken in line II—II, a protruded feed port 20 which protrudes into the middle part of the high actively fluidized bed and then bends upwards as marked with an arrow symbol, and another protruded feed port 18' which protrudes in the same way as said protruded feed port 20 and has a nozzle aperture opened downwards. Moreover additional feed or supply port may be provided, for instance, at a level X—X and another level Y—Y in FIG. 12, as required.

As the solid combustible raw material is thermally decomposed and gasified by means of the circulating powder-grain materials, as described above, inorganic material involved in the raw material in the form of ash stays in the reactor. A smaller size of inorganic residue is removed from the reactor system together with the produced gas or combustion gas, while a large granular one is continuously or intermittently extracted from the bottom of the reactor, because it descents thereto due to its own gravity. The extracted large residue is then subjected to shieving so as to remove fine ash therefrom. The resultant granular residue may be available as circulating working medium for the reactor by feeding back into the reactor at any adequate location thereof so that the high actively fluidized bed is maintained at a constant level and activity.

Figure 13:
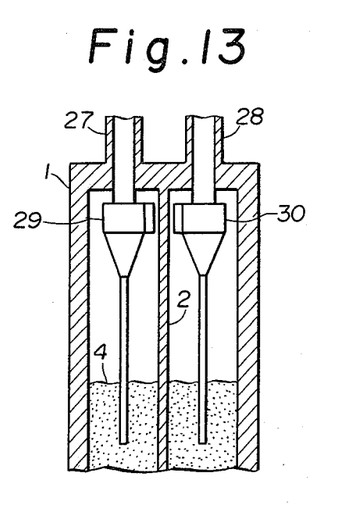
FIG. 13 is a partial vertical sectional view of the reactor, wherein dust or powder material collectors are arranged and extended in the vertical direction within the reactor at the upper portion thereof.

As apparent, FIGS. 1, 2 and 12 illustrate the case where the produced gas and combustion gas are removed directly from the reactor. As required, however, dust or powder collector may be arranged at the upper part of the reactor as illustrated in FIG. 13, wherein the reference numeral 29 designates a dust or powder collector in the form of cyclone separator, by which powder material in the produced gas from the thermal decomposition and gasification process, while the reference numeral 30 does another dust or powder collector for collecting powder carried in the combustion gas from the combustion and heating section. The recovered powder material comes back again into the fluidized bed.

As described above, the method and apparatus in accordance with the present invention are advantageously applied for thermal decomposition and gasification operation in small or middle scale at a higher efficiency, because the reactor is constructed in a single high active fluidization in a small size, through which working medium in the form of powder-grain composite performs circulation together with combustible raw material to be processed, although hitherto this kind thermal decomposition and gasification with the aid of circulating working medium in two fluidized reactors has been considered as disadvantageous for smaller size of operation due to complexity in structure and operation as well as high thermal loss accompanied thereto. Specifically, the method and apparatus in accordance with the present invention not only bring about remarkable effect in energy saving, but also facilitate to utilize used plastics, combustible wastes from agriculture and forest industries and the like as secondary or auxiliary energy source or serve as local power source, since the hitherto unused energy source which is located in a place very inconvenient for gathering and transporting is capable of being converted into combustible gas having higher calorie in the reactor of the invention even any remote site so that the combustible gas is distributed for utilization in the remote area.

Now the present invention will be further described with the aid of the following examples.

EXAMPLE 1

Thermal decomposition carried out for heavy type crude oil which is supplied into the middle part of the reactor by way of spraying through specific spray nozzles, wherein said reactor is constructed in such a cylindrical tapered tower type as illustrated in FIG. 1, having an inner diameter of 120 mm and a height of 1,400 mm, which is filled with refractory granular materials having means diameter of 0.25 mm in a high active fluidization, while it is maintained at an elevated temperature by heating the outer peripheral surface thereof with the aid of electrical heating means arranged thereabout. It is to be added that the whole quantity of the refractory material filled in the reactor amounted to 6.5 kg.

| | |
|---|---|
| Supplied heavy type crude oil from Kafuji | 1.1 Kg/hr |
| Temperature in thermal decomposition section of the fluidized bed | 789° C. |
| Temperature in combustion and heating section of the fluidized bed | 835° C. |
| Supply rate of steam | 2.1 Kg/hr |
| Supply rate of combustion air | 3.6 Nm³/hr |
| Rate of produced dry gas | 1.28 Nm³/hr |
| Weight ratio of liquid produced product | 41.2% |

Chemical compositions of dry gas (in weight percentage in comparison with supplied heavy oil)

| | | | |
|---|---|---|---|
| H | 2.2% | $C_4H_6$ | 3.4% |
| CO | 2.2% | $C_4H_8$ | 1.2% |
| $CO_2$ | 11.2% | $CH_4$ | 11.5% |
| $C_2H_2$ | 0.2% | $C_2H_6$ | 2.2% |
| $C_2H_4$ | 21.2% | $C_3H_8$ | 0.3% |
| $C_3H_6$ | 9.0% | $C_4H_{10}$ | 0.7% |

Circulation rate of refractory granular materials 38 Kg/hr

EXAMPLE 2

Thermal decomposition and gasification were carried out for the following crashed solid combustible wastes gathered from city area having mean size smaller than 5 mm with the use of the same reactor as in EXAMPLE 1 under the following conditions, said reactor being filled with sands having mean grain size of 0.2 mm as circulating working medium.

| | | | |
|---|---|---|---|
| Chemical compositions of the wastes from city area (in weight percentage) | | | |
| Moisture | 45%, | Combustible material | 38%, |
| Incombustible material | 17% | | |
| Analysis of the aforesaid solid wastes (in weight percentage) | | | |
| Wood and the like | 5% | Iron or steel | 11% |
| Fibrous material | 6% | Non-metallic material | 1% |
| Paper | 49% | Sand, soil, glass | 5% |
| Garbage from kitchen | 15% | Plastics | 6% |
| Conditions of thermal decomposition | | | |
| Total quantity of thermal medium in the system | | 6.1 Kg | |
| Supply rate of wet solid wastes | | 4.5 Kg/hr | |
| Temperature in the thermal decomposition and gasification section of the fluidized bed | | 705° C. | |
| Temperature in the combustion and heating section of the fluidized bed | | 830° C. | |
| Supply rate of steam | | 2.3 Kg/hr | |
| Supply rate of combustion air | | 4.2 Nm³/hr | |
| Circulation rate of sand | | 35.0 Kg/hr | |
| Results of reaction | | | |
| Liquid produced material | | 0.2 Kg/hr | |
| Volume of produced dry gas | | 1.2 Nm³/hr | |
| True caloric unit of the same | | 3,950 Kcal/Nm³ . C. | |

The present invention has been described with respect to the preferred embodiments thereof in that way, but it should be of course understood that the present invention isn't limited only to them and the same may be adequately changed or modified without any departure of the spirit and scope of the invention.

What is claimed is:

1. An apparatus for thermally decomposing and gasifying combustible material, comprising:
   a reactor constructed in the form of a cylindrical hollow tower containing a fluidized bed and having an upper section, a middle section, and a lower section, the lower section including a tapered portion, and the length of the tower being more than three times as long as its inner diameter at its middle section;
   a first partition extending substantially in the vertical direction within the tower such that the upper section of the tower is divided into two sections;
   a second partition intersecting the first partition in the middle portion of the tower at substantially a right angle thereto, said second partition extending lower than said first partition and into said lower section to a location above the bottom such that the interior of the tower is divided into four space sections at the middle section and into two space sections at the lower section;

a plurality of steam supply connected feed ports formed at both space sections of said lower section for supplying steam thereinto;

a plurality of air or oxygen supply connected feed ports formed at two space sections of said middle section for supplying air or mixture gas of oxygen thereinto; and a plurality of steam supply connected feed ports formed at the other two space sections of said middle section for supplying steam thereinto.

2. An apparatus as set forth in claim 1, wherein a combustible material feed port through which preferably liquid combustible material is to be supplied is located in position at the middle portion of the tower.

3. An apparatus as set forth in claim 1, wherein a combustible material feed port through which preferably solid combustible material is to be supplied is located in position above the upper surface of the fluidized bed.

4. An apparatus as set forth in claim 1, wherein, said feed ports protrude into the middle part of the middle sections.

5. An apparatus as set forth in claim 1, wherein the lower section of the reactor has a rectangular section.

6. An apparatus as set forth in claim 1, wherein the first and second partitions are unsymmetrically located at a right angle to each other.

7. An apparatus as set forth in claim 1, wherein gas outlet ports are provided at both of the upper two sections.

8. An apparatus as set forth in claim 1 wherein dust collectors are arranged at both of the upper two sections.

* * * * *